United States Patent
Agnese

(10) Patent No.: US 7,030,453 B1
(45) Date of Patent: Apr. 18, 2006

(54) BOLOMETRIC DETECTOR WITH AN ANTENNA

(75) Inventor: Patrick Agnese, Voreppe (FR)

(73) Assignee: Commissariat a L'Energie Atomique, Paris (FR)

( * ) Notice: Subject to any disclaimer, the term of this patent is extended or adjusted under 35 U.S.C. 154(b) by 0 days.

(21) Appl. No.: 09/869,590

(22) PCT Filed: Dec. 28, 1999

(86) PCT No.: PCT/FR99/03301

§ 371 (c)(1),
(2), (4) Date: Oct. 15, 2001

(87) PCT Pub. No.: WO00/40937

PCT Pub. Date: Jul. 13, 2000

(30) Foreign Application Priority Data

Dec. 30, 1998 (FR) .................... 98 16648

(51) Int. Cl.
*H01L 27/14* (2006.01)
*H01L 31/00* (2006.01)
*H01L 31/058* (2006.01)

(52) U.S. Cl. ............... 257/428; 257/467; 257/470
(58) Field of Classification Search ........ 257/467–470, 257/428; 250/250, 338.1, 227.11; 505/161; 374/32
See application file for complete search history.

(56) References Cited

U.S. PATENT DOCUMENTS

| | | | |
|---|---|---|---|
| 5,171,733 A | | 12/1992 | Hu |
| 5,286,976 A | * | 2/1994 | Cole ..................... 250/349 |
| 6,292,140 B1 | * | 9/2001 | Osterman ............ 343/700 MS |
| 6,329,655 B1 | * | 12/2001 | Jack et al. ............... 250/338.1 |

FOREIGN PATENT DOCUMENTS

| | | | |
|---|---|---|---|
| DE | 3333410 A | * | 4/1985 |
| WO | WO 93/25877 | | 12/1993 |
| WO | WO 97/21250 | | 6/1997 |

OTHER PUBLICATIONS

D. P. Osterman, et al., Applied Physics Letters, vol. 71, No. 16, pp. 2361-2363, "Antenna-Coupled Bolometer With a Micromachined-Beam Thermal Link", Oct. 20, 1997.

* cited by examiner

*Primary Examiner*—Shouxiang Hu
(74) *Attorney, Agent, or Firm*—Oblon, Spivak, McClelland, Maier & Neustadt, P.C.

(57) ABSTRACT

The invention relates to a bolometric detector comprising a receiving antenna (2a, 2b, 2c, 2d) for collecting electromagnetic waves and a resistive load for converting the power of electromagnetic waves into heating power. The resistive load is the load resistor of the antenna.

The invention is more particularly applied to the detection of objects in "all-weather" conditions (rain, fog, smoke, etc).

1 Claim, 7 Drawing Sheets

BOLOMETRIC DETECTOR WITH AN ANTENNA

BACKGROUND OF THE INVENTION

1. Field of the Invention

The invention relates to a bolometric detector with an antenna as well as to a method for manufacturing such a detector.

The invention is more specifically applied to the passive detection of electromagnetic waves with millimetric wavelengths.

The detection is said to be passive when the observed scene emits the signal to be detected, on its own, either directly by its own emission of a grey body which it forms, or indirectly, by reflection on another grey body.

2. Discussion of the Background

Passive detection of millimetric waves is presently based on two different principles.

According to a first principle, the electromagnetic wave is detected by an antenna so as to generate an electric signal, the processing of which is carried out by an electronic circuit operating at the wave's frequency. According to a second principle, the electromagnetic wave is detected by an antenna so as to generate a heat flux which is measured.

A disadvantage of the detectors operating according to the first principle is that they are limited in frequency.

Indeed, the technologies used for producing such circuits, such as technologies based on gallium arsenide (AsGa) or indium phosphide (InP), are presently inaccessible at frequencies higher than 100 GHz, for example.

Moreover, in the case when the detectors have to be brought together as a matrix of n×m detectors, such circuits have high power dissipation, of the order of 1 Watt for a 32×32 matrix, for example. This is also a disadvantage.

Detectors operating according to the second principle form the class of bolometric detectors.

Bolometric detection is such that the power of the electromagnetic wave which is collected by the antenna is converted in a resistive load into heating power which is measured. Measurement of heating power is performed by means of a thermal conductance which converts the heat flux into a rise in temperature relatively to a reference temperature. The thus determined rise in temperature is converted into an electric signal by a component, a so-called "thermometric component".

A bolometric detector according to the known art is described in the article entitled "Antenna-coupled bolometer with a micromachined—beam thermal link" and published in the journal "Appl. Phys. Lett. 71 (16)" as of Oct. 20$^{th}$ 1997.

Such a bolometric detector comprises:
a receiving antenna for collecting electromagnetic waves,
a resistive load for converting the collected electromagnetic power into heating power,
a transmission line or guide for transmitting the electromagnetic waves received by the antenna to the resistive load,
means for measuring the heating power.

The presence of the transmission line or guide between the receiving antenna and the resistive load has several disadvantages. A first disadvantage is that it participates not insignificantly to the bulkiness of the bolometric detector. Another disadvantage is the difficulty in producing such a line or guide for high frequency circuits, such as for frequencies beyond 50 GHz.

SUMMARY OF THE INVENTION

The invention does not have such disadvantages.

The invention relates to a bolometric detector comprising a receiving antenna for collecting electromagnetic waves, the receiving antenna having a load resistor, a resistive load for converting the power of the received electromagnetic waves into heating power and means for measuring the heating power. The resistive charge is formed by the load resistor of the receiving antenna.

The invention also relates to a method for manufacturing a bolometric detector comprising a receiving antenna and a thermometric component. The manufacturing method consisting of the following steps:

a step for producing a structure formed by the stacking of a silicon substrate, an oxide layer and a silicon layer, a step for producing a doped area in the silicon layer in order to form the thermometric component as a diode and to cover the silicon layer with a silicon oxide layer, a step for producing the electric contacts of the diode, a step for producing, by depositing a metal on the silicon oxide layer, the metal components forming the receiving antenna, a step consisting of dry etching the oxide and silicon layers in order to define a recessed area which localizes the diode, a step consisting of depositing a passivation layer and of etching this layer in order to leave free access to the electric contacts of the diode and areas for recovering electric contact with the antenna metal components, a step consisting of depositing a conducting layer on the electric contacts of the diode, on the areas for recovering electric contact with the antenna metal components and on the recessed area which localizes the diode, a step for removing the oxide located under the diode and under the recessed area qui localizes the diode in order to create a cavity.

According to the preferred embodiment of the invention, a microbolometer silicon is associated with a plane quadrupolar antenna arranged on a dielectric cavity formed by the silicon support itself and resonant at the frequencies of use. Such a configuration is particularly well suited for producing a complex focal plane with a n×m pixel matrix structure enabling a low dissipation readout circuit to be integrated therein. It is understood that low dissipation means dissipation less than 100 mW for a 32×32 matrix, for example.

BRIEF DESCRIPTION OF THE FIGURES

Other features and advantages of the invention will become apparent upon reading about a preferred embodiment of the invention with reference to the appended figures, wherein.

In all the figures, the same references designate the same components.

DETAILED DESCRIPTION OF THE EMBODIMENTS OF THE INVENTION

Figure 1:
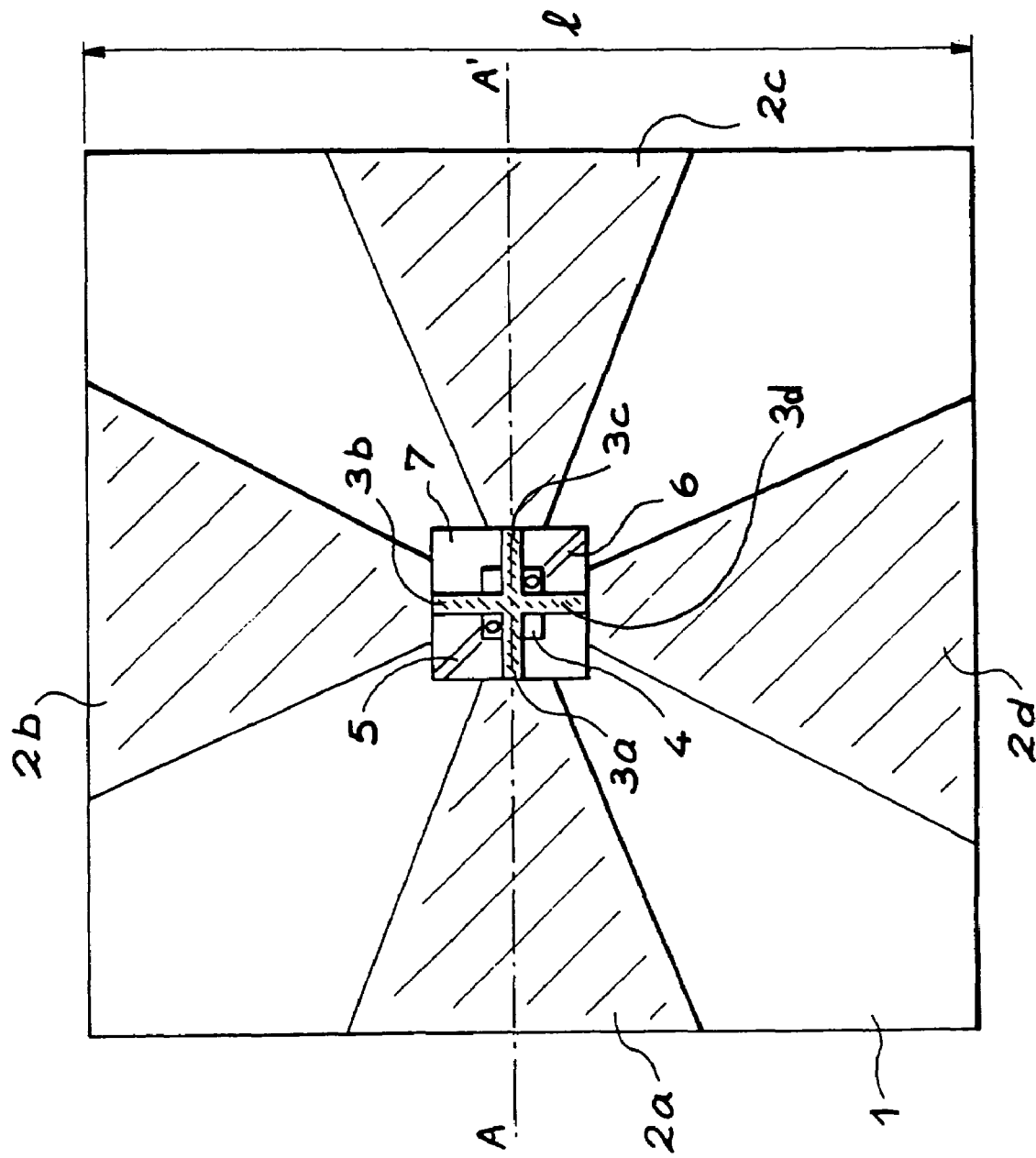
FIG. 1 represents a top view of a bolometric detector according to the invention.

FIG. 1 represents a top view of a bolometric detector according to the invention.

Four plane metal components $2a$, $2b$, $2c$, $2d$ lie on a silicon layer 1. These four components are preferably arranged in the shape of a cross around a central recessed portion 7. Metal components $2a$ and $2c$ are aligned along an axis AA' and metal components $2b$ and $2d$ are aligned along an axis perpendicular to the AA' axis.

In the central recessed portion 7, a conducting structure in the shape of a cross with four arms $3a$, $3b$, $3c$, $3d$ enables the four metal components $2a$, $2b$, $2c$, $2d$ to be connected with each other. Arms $3a$ and $3c$ are aligned along the AA' axis and arms $3b$ and $3d$ along the axis perpendicular to the AA' axis.

The four metal arms $3a$, $3b$, $3c$, $3d$ cover a diode 4, there where they intersect. Diode 4 is produced as described later (cf. description, FIG. 6).

The four plane metal components $2a$, $2b$, $2c$, $2d$ form the antenna for receiving the signal. According to the invention, the metal components $2a$, $2b$, $2c$, $2d$ also form the resistive load for converting the power of electromagnetic waves into heating power.

The thus dissipated heating power in the antenna metal components leads to heating of the arms $3a$, $3b$, $3c$, $3d$. Heating of arms $3a$, $3b$, $3c$, $3d$ leads to heating of the diode 4. As a result, the diode 4 forms the thermometric component of the bolometric detector. Advantageously, the thermometric component (diode 4) is electrically insulated from the antenna circuit (antenna metal components and associated loads).

In the absence of any detection of electromagnetic waves, a reference current Iref flows through the diode. When an electromagnetic wave is detected, diode 4 heats up and the current flowing through it differs from the Iref current. Metallizations 5 and 6 provide connections from both terminals of diode 4 to a circuit (not shown in the figure) for processing the variations of the current flowing through the diode.

Figure 6A:
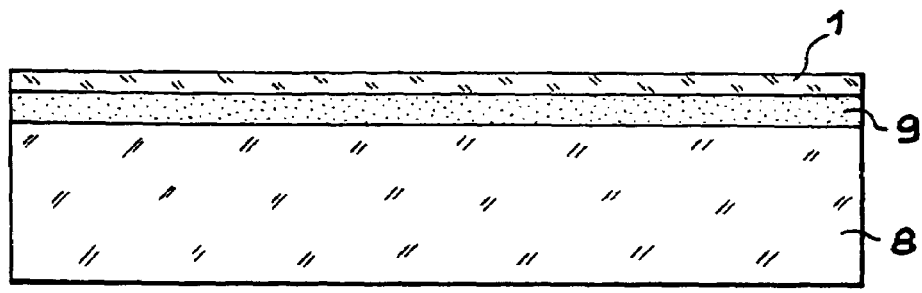
FIGS. 6A–6H represent a method for manufacturing a bolometric detector according to the invention.

Diode 4 is implemented in a silicon wafer as shown in FIG. 6A. A detector with very low specific heat capacity for room temperature operation, high thermal insulation is obtained through the resistive metal of components $3a$, $3b$, $3c$, $3d$ and a high performance as regards low frequency noise is obtained because of the use of a thermometric diode on monocrystalline silicon.

As seen from above, the bolometric detector illustrated in FIG. 1, forms a square of side 1. According to the preferred embodiment of the invention, side 1 is equal to $\lambda/2$, with $\lambda$ the wavelength of a wave for which detection is desired.

In the case of signals to be detected within a frequency band, side L, preferably is equal to $\lambda/2$, wherein $\lambda$ is set to the wavelength of the wave with a frequency equal to the central frequency of the band.

Figure 2:
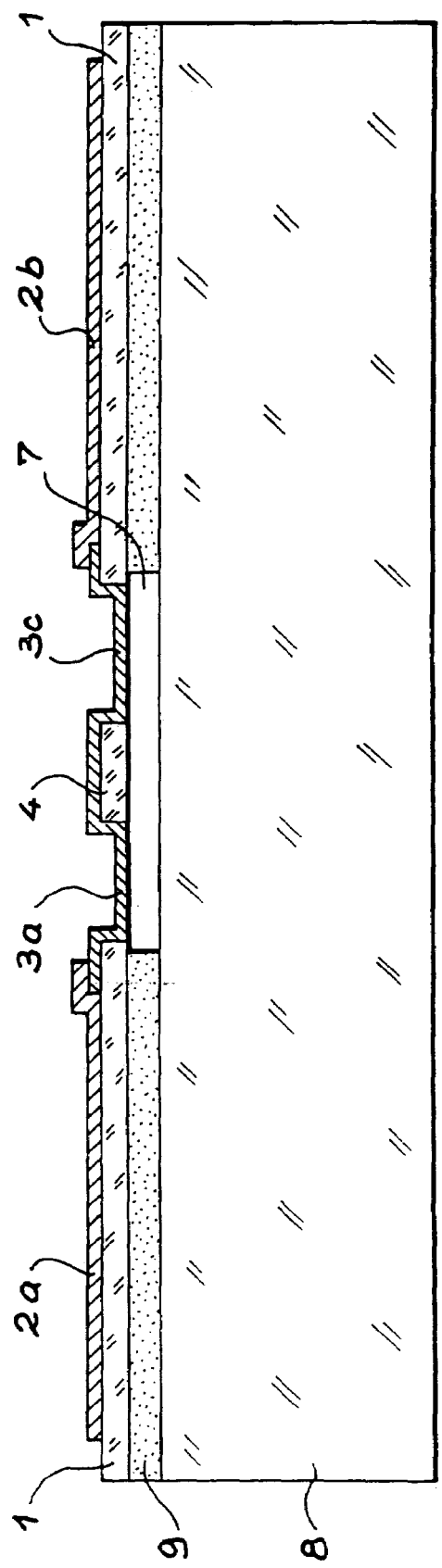
FIG. 2 represents a simplified sectional view of the bolometric detector according to FIG. 1.

FIG. 2 represents a simplified sectional view of the bolometric detector according to FIG. 1. The section is taken along the AA' axis of FIG. 1.

The structure of FIG. 2 consists of a silicon substrate 8 on which an oxide layer, a silicon layer and the metal components $2a$, $2b$ forming an antenna are stacked successively.

The oxide 9 and silicon 1 layers are recessed in their central portion 7 in order to enable arms $3a$ and $3b$ as well as diodes 4 to hang over the recess thus provided.

Figure 3:
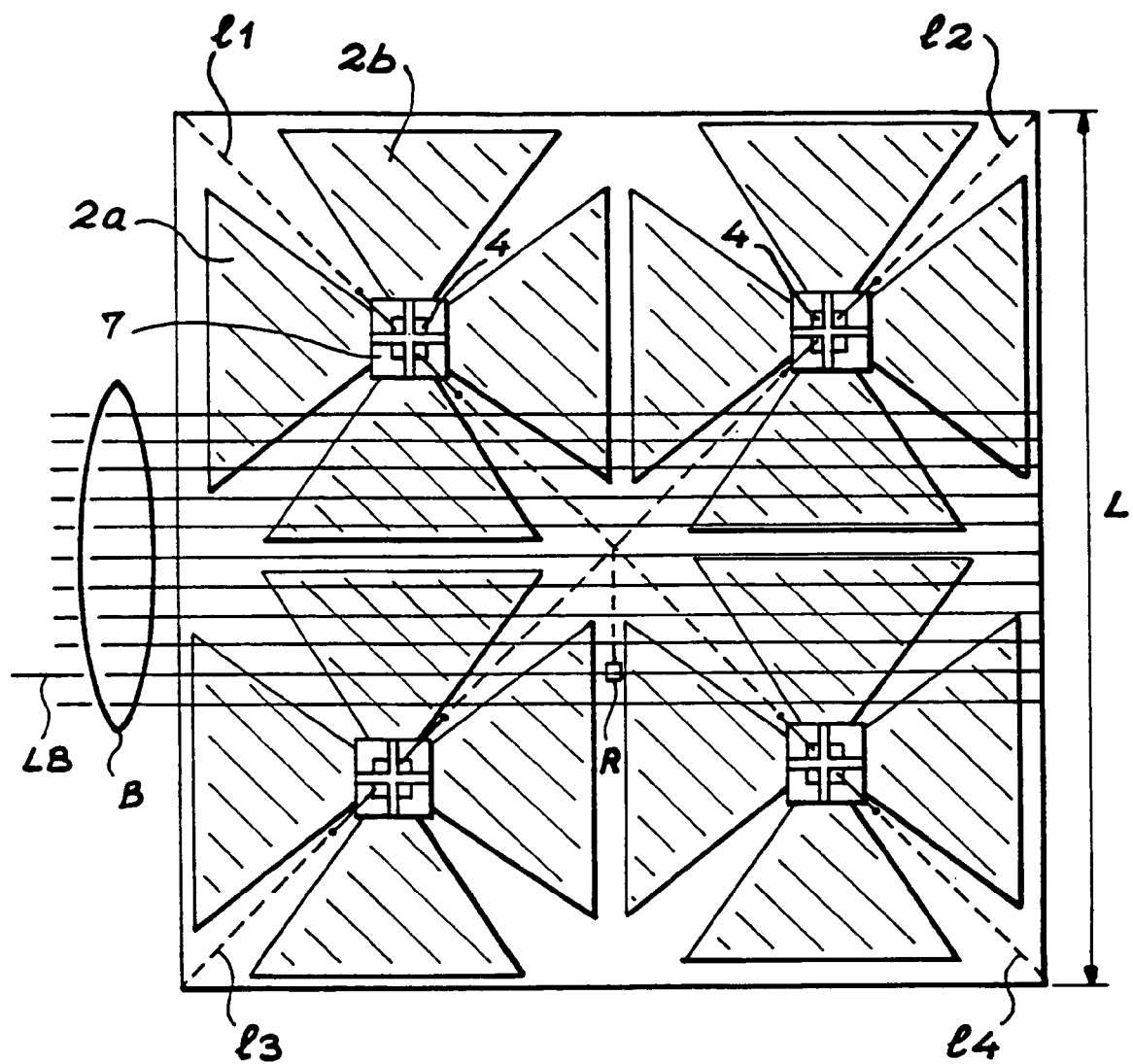
FIG. 3 represents a top view of the combination of four bolometric detectors according to a first embodiment of the invention.

FIG. 3 represents a top view of the combination of four bolometric detectors according to a first embodiment of the invention.

The four detectors are placed side by side in order to form, as seen from above, a square of side L.

According to the preferred embodiment of the invention, the length of side L is the wavelength k of a wave for which detection is desired. In the case of signals to be detected within a frequency band, side L is preferably equal to the wavelength of the wave with a frequency equal to the central frequency of the frequency band. According to this embodiment of the invention, a horn does not then need to be associated which each bolometric detector. This embodiment is particularly advantageous as an antenna horn is a relatively bulky 3-dimensional structure and cannot be made entirely by micro-machining of silicon.

However, the invention also relates to the case when each detector itself forms a square for which side L has a length equal to the wavelength $\lambda$. As a result, the combination of four detectors such that of FIG. 3 forms a structure for which side L is substantially equal to 2 $\lambda$.

According to the preferred embodiment of the invention, four thermometric diodes are mounted in parallel.

As described earlier (cf. FIG. 1), each diode 4 is provided with a first terminal and a second terminal. The conducting connections between the terminals of the different diodes are shown as broken lines in FIG. 3.

A first set of connections converges towards the center of the detector and connects the first terminals of the different diodes. A contact recovery R enables an electric contact to be established between the different connections of this first set and a connection line $L_B$ of bus B.

A second set of connections 11, 12, 13, 14 provides connection to a same electric reference such as for example the substrate, the second terminal of each diode.

Figure 4:
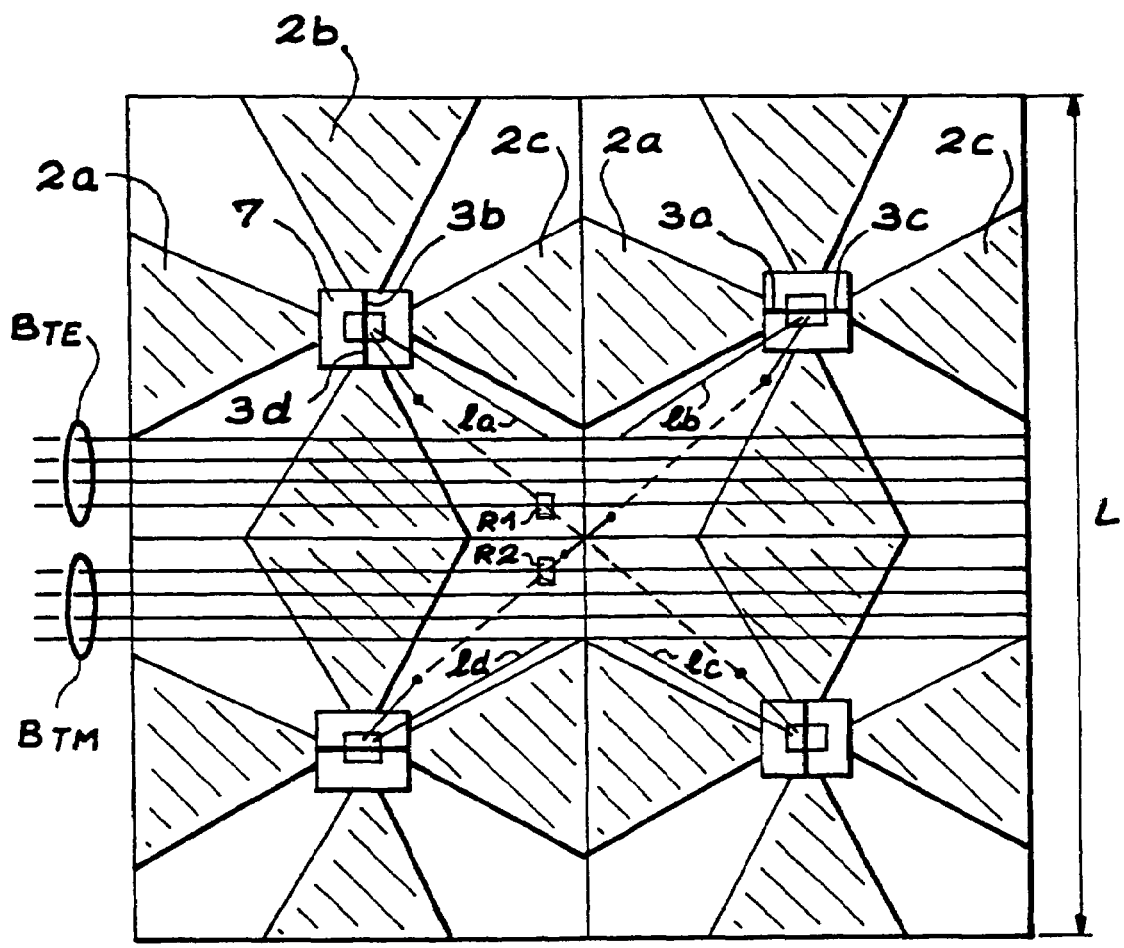
FIG. 4 represents a top view of the combination of four bolometric detectors according to a second embodiment of the invention.

FIG. 4 represents a combination of four bolometric detectors according to a second embodiment of the invention.

According to a second embodiment of the invention, the collected waves are of the TE and TM type. As is known to the one skilled in the art, the acronym TM comes from the expression "Transverse Electric" and the acronym TE from the expression "Transverse Magnetic".

According to this embodiment, the conducting structure located in the central portion 7 of each bolometric detector and which partly covers each diode, only comprises two arms providing connections between two of the four metal components of the antenna located facing each other. With reference to the notations of FIG. 1, when the conducting structure of a first bolometric detector comprises two metal arms $3b$, $3d$ connected to the antenna metal components $2b$ and $2d$, then the metal arms $3a$, $3c$ of the conducting structures of both bolometric detectors which have a common face with the first bolometric detector are connected to the antenna metal components $2a$, $2c$.

In the same way as in the case of FIG. 3, the four bolometric detectors are placed side by side in order to form, as seen from above, a square of side L.

Both bolometric detectors located along a first diagonal of the square enable waves of a first type, for example of the TM type, to be collected, and the two bolometric detectors located along the diagonal perpendicular to the first diagonal enable waves of a second type for example of the TE type, to be collected.

A set of conducting connections (lines with broken segments and lines with continuous segments $1a$, $1b$, $1c$, $1d$) enables the two diodes associated with two detectors which collect waves of the TM type, to be mounted in parallel on the one hand and enables the two diodes associated with two detectors which collect the waves of the TE type to be mounted in parallel on the other hand.

A connection bus $B_{TE}$ provides recovery $R_1$ of electrical contacts which correspond to the two diodes mounted in parallel associated with two detectors which collect the waves of the TE. type. Similarly, a connection bus $B_{TE}$ provides recovery $R_2$ of electrical contacts which correspond to two diodes mounted in parallel, associated with two detectors which collect the waves of the TM type.

Advantageously, the invention according to this second embodiment, because of TE and TM double polarization imaging, enables information rich in teachings to be collected on the nature of observable polarizing materials.

Figure 5:
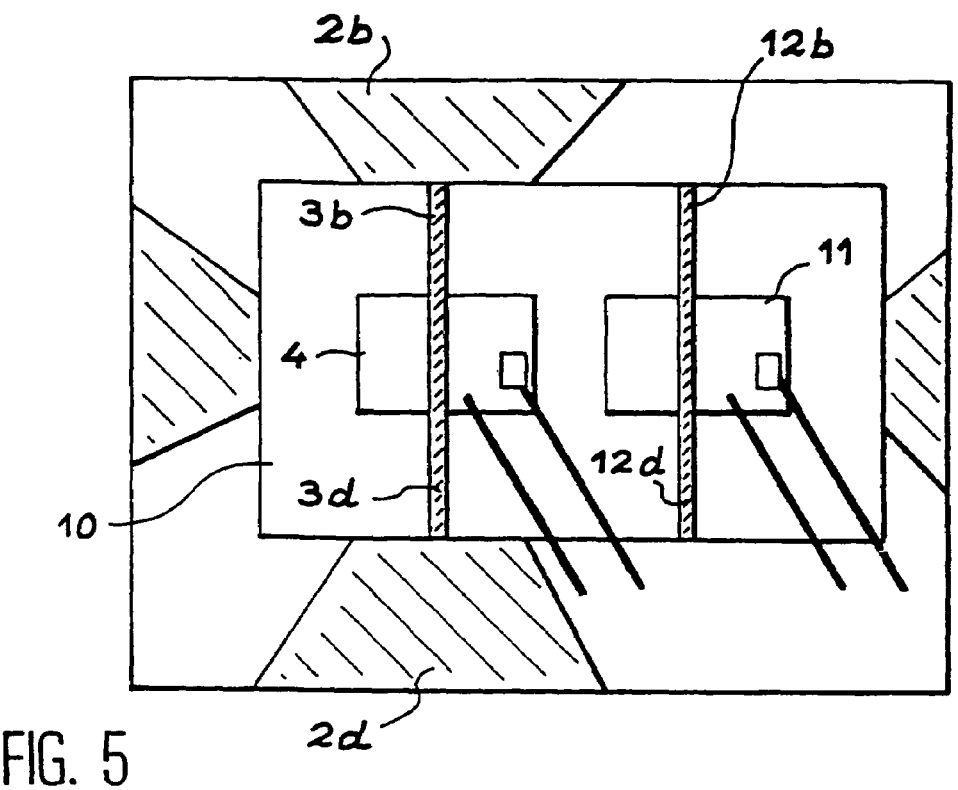
FIG. 5 represents a detailed view of a bolometric detector enhancement in the case of a combination of bolometric detectors according to the second embodiment of the invention.

FIG. 5 represents a detailed view of an enhancement of a bolometric detector in the case of a combination of bolometric detectors according to the second embodiment of the invention.

FIG. 5 represents a recessed central portion 10 of a bolometric detector. The central portion 10 comprises two diodes 4 and 11. Diode 4 is partly covered with two conducting arms 3b, 3d, connected to the antenna metal components 2b, 2d. Diode 11 partly covered with two conducting arms 12b, 12d is located parallel to diode 4. Both conducting arms 12b and 12d are electrically insulated and connected to the thermal reference formed by the silicon substrate 8.

Diodes 4 and 11 are biased under the same conditions and may operate either under voltage or current.

Such a configuration enables all or part of the parasitic signals received by the bolometric detector to be removed by differential readout of the signals derived from the diodes. In particular, signals located in the thermal infrared band may be removed advantageously. Similarly, all or part of the fluctuations or parasitic drifts of the reference temperature of the bolometric detector may be removed.

FIGS. 6A–6H represent a method for manufacturing a bolometric detector according to a first embodiment of the invention.

FIG. 6A represents the realization of a structure formed by stacking a silicon substrate 8, an oxide layer 9, for example of the SIMOX type, and a silicon layer 1, for example grown by epitaxy or deposited by transfer. The silicon layer 1 is for example a layer of a few tenths of microns thick.

Figure 6B:
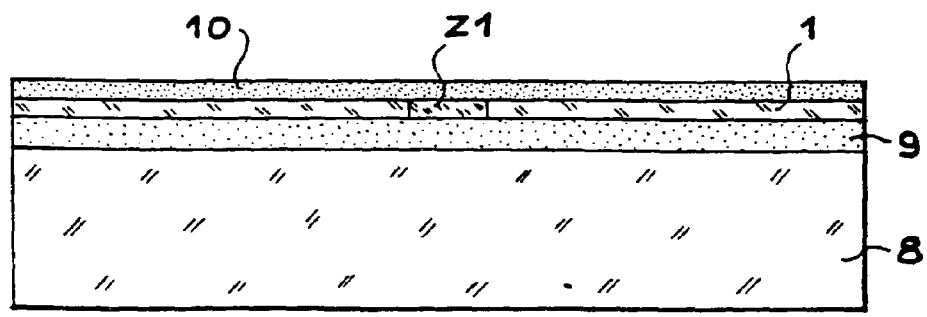

FIG. 6B represents the realization of a doped area Z1 in the silicon layer 1 and the covering of the latter by a silicon oxide layer 10. Area Z1 is made, in a way known per se, through localized implantation.

Figure 6C:
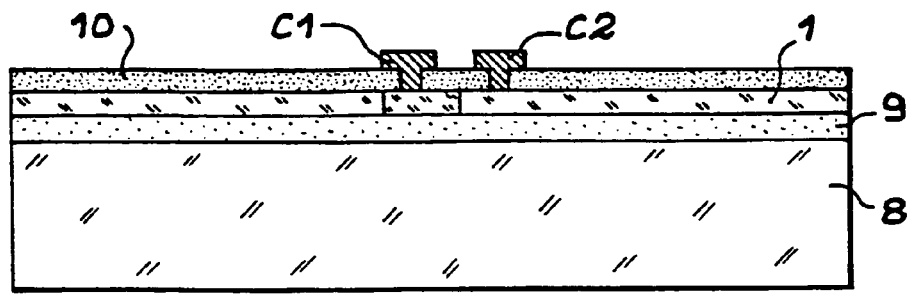

FIG. 6C represents the realization of electric contacts C1 and C2 of the thermometric diode of the bolometric detector. The apertures enabling the contacts C1 and C2 to be made, are made by etching the oxide layer 10. Contacts C1 and C2 are made by metal deposition and etching.

Figure 6D:
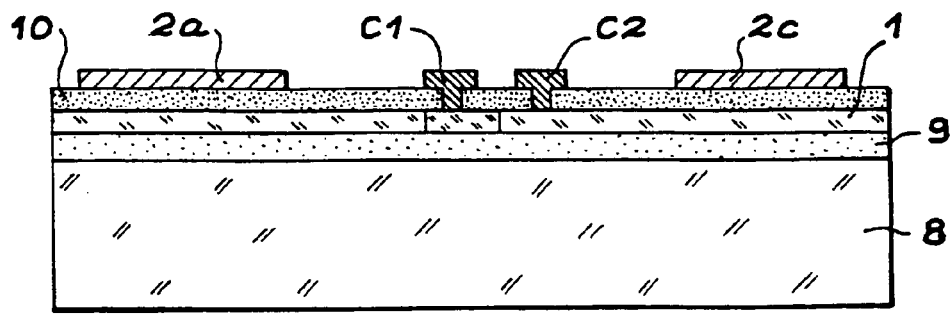

FIG. 6D represents the realization of the metal components (2a, 2b, 2c, 2d) which form the antenna of the detector. Preferably, the metal of the antennas has low electric resistivity. The resistance between the extreme points of a same antenna metal component may thus be, for example, of a few ohms. Each metal component for example, comprises three successive metal layers: a first layer, for example of chromium or titanium, with which good adherence to the oxide may be provided, a second layer, for example of nickel or of palladium, enables a diffusion barrier to be made for the third layer which for example may be in gold.

Figure 6E:
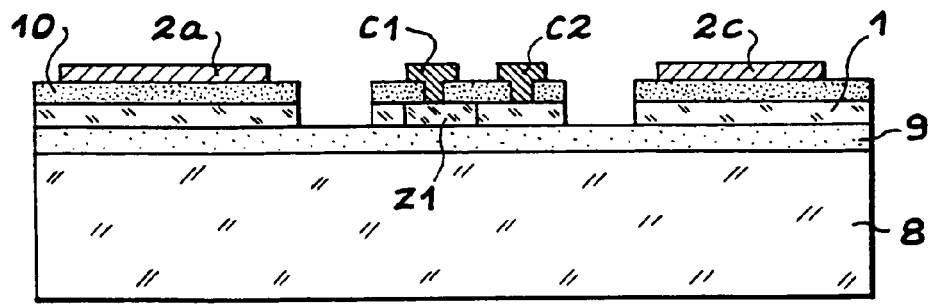

FIG. 6E represents the operation for defining the area which localizes the thermometric diode of the detector. For this purpose, dry etching on the front face is successively carried out on the oxide layer 10 and the silicon layer 1.

Figure 6F:
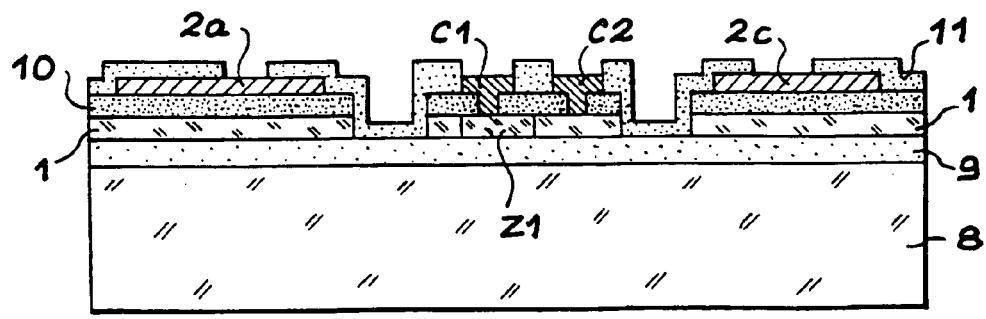

The step represented in FIG. 6F consists of depositing a passivation layer 11 and of etching this layer in order to leave free access to the areas for recovering electric contact on the thermometric diode and on the antenna metal components.

Figure 6G:
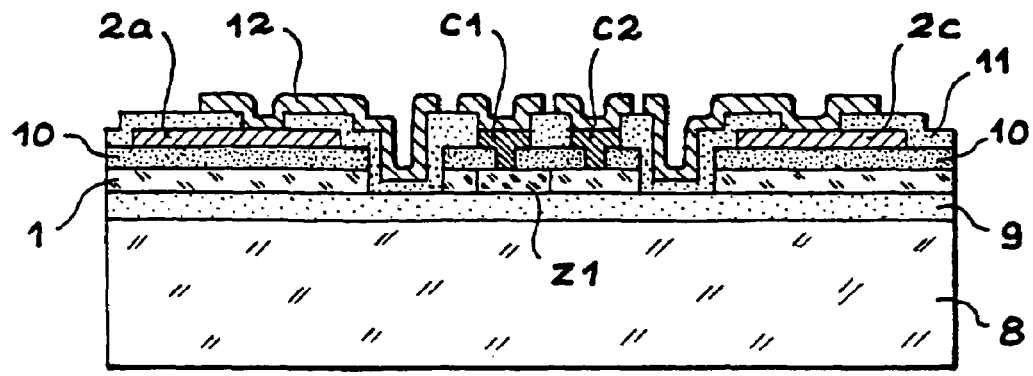

The step represented in FIG. 6G consists of depositing an etching conductor 12 of the conducting structure which for example, may be a metal nitride such as titanium nitride or tungsten nitride.

Figure 6H:
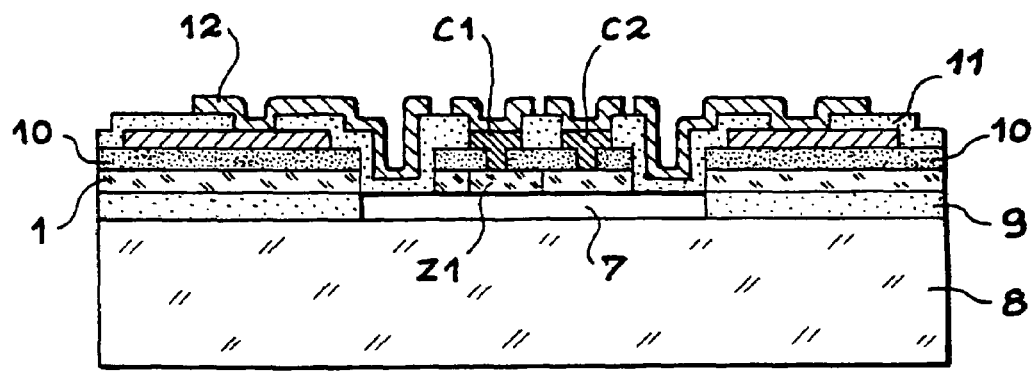

The step represented in FIG. 6H consists of removing, in a way known per se, the oxide under the thermometric diode and under the area which localizes the thermometric diode in order to form the cavity 7.

Figure 7:
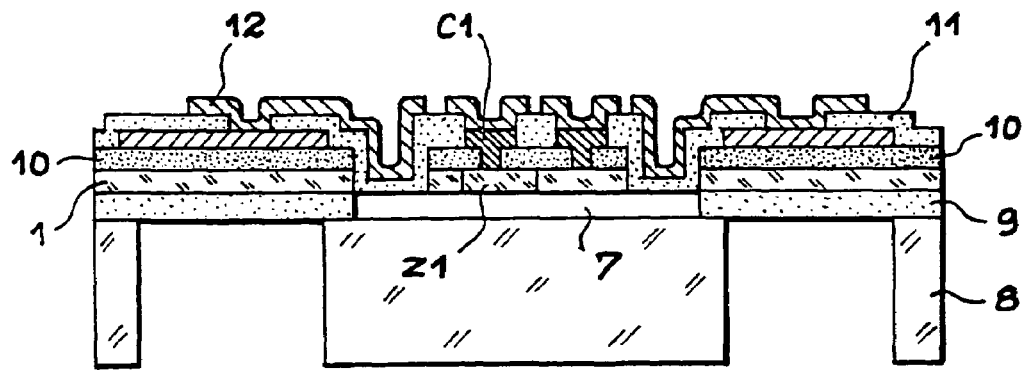
FIG. 7 represents an enhancement of the method for manufacturing a bolometric detector according to FIGS. 6A and 6H.

FIG. 7 represents an enhancement of the method for manufacturing a bolometric detector according to FIGS. 6A–6H.

According to this enhancement, the silicon substrate 8 is etched on its rear face under the antenna metal components. This etching enables the dimensions of the resonant cavity to be changed, which is formed by the silicon substrate 8. This change advantageously induces a widening of the absorption spectral band of the detector.

As mentioned earlier, the invention is more particularly applied to the detection of electromagnetic waves with millimetric wavelength. The frequencies of the electromagnetic waves detected are, for example, frequencies within the transparent bands of the atmosphere, i.e. frequencies centered around 94 GHz, 140 GHz or even 220 GHz.

Atmospheric transmission in the aforementioned frequency bands is of a higher quality than atmospheric transmission in an infrared band. Advantageously, according to the invention, the result is the possibility of detecting objects under "all weather" conditions (rain, fog, smoke, etc. . . . ).

What is claimed is:

1. An imaging device comprising at least a set of four bolometric detectors arranged side by side, wherein each of the at least four bolometric detectors is a detector comprising a receiving antenna for collecting electromagnetic waves, the receiving antenna having a load resistance, a resistive load for converting the power from the electromagnetic waves into heating power, a thermometric component for measuring a rise in temperature of said receiving antenna, relatively to a reference temperature, associated with the heating power, wherein the resistive load is formed by the load resistance of the antenna, and the thermometric component is electrically insulated from the load resistance of the antenna, and the at least four bolometric detectors are arranged so that respective thermoelectric devices are mounted in parallel, wherein a first two of said at least four bolometric detectors are configured to receive TE waves and another two of said at least four bolometric detectors are configured to collect TM waves, wherein the thermoelectric components of the first two of said at least four bolometric detectors are connected for forming a first parallel circuit and the thermoelectric components of the second two of said at least four bolometric detectors are connected to form a second parallel circuit, wherein each of said at least four bolometrics detector comprises a diode placed in a vicinity of the respective thermoelectric component, wherein each diode is configured to remove all or part of parasitic signals received by the respective bolometric detector through differential readout of signals generated by said respective bolometric detector and signals derived from said diode.

* * * * *